United States Patent
Huang et al.

(10) Patent No.: US 11,184,577 B2
(45) Date of Patent: Nov. 23, 2021

(54) METHOD AND DEVICE FOR ADJUSTING MULTIMEDIA BLACKBOARD, MEDIUM, AND ELECTRONIC APPARATUS

(71) Applicant: Ambow Sihua Intelligent Technology Co., Ltd., Beijing (CN)

(72) Inventors: Jin Huang, Beijing (CN); Qiaoling Xu, Beijing (CN); Gang Huang, Beijing (CN); Kesheng Wang, Beijing (CN); Zhengke Hou, Beijing (CN); Zheyu Wu, Beijing (CN)

(73) Assignee: AMBOW SIHUA INTELLIGENT TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/847,746

(22) Filed: Apr. 14, 2020

(65) Prior Publication Data
US 2021/0289161 A1  Sep. 16, 2021

(30) Foreign Application Priority Data
Mar. 16, 2020 (CN) .......................... 202010182765.7

(51) Int. Cl.
*H04N 5/655* (2006.01)
*H04N 13/282* (2018.01)

(52) U.S. Cl.
CPC ........... *H04N 5/655* (2013.01); *H04N 13/282* (2018.05)

(58) Field of Classification Search
CPC ............................ H04N 5/655; H04N 13/282
See application file for complete search history.

(56) References Cited

U.S. PATENT DOCUMENTS

| | | | | |
|---|---|---|---|---|
| 6,437,314 | B1* | 8/2002 | Usuda | G06F 3/03545 178/19.05 |
| 2002/0145595 | A1* | 10/2002 | Satoh | G06F 3/04883 345/173 |
| 2008/0198427 | A1* | 8/2008 | Wang | H04N 1/0318 358/497 |
| 2010/0171891 | A1* | 7/2010 | Kaji | G02F 1/13338 349/12 |
| 2011/0062316 | A1* | 3/2011 | Kiyose | G06F 3/0428 250/221 |
| 2011/0063253 | A1* | 3/2011 | Kiyose | G06F 3/0428 345/175 |
| 2011/0084903 | A1* | 4/2011 | Onishi | G01J 1/0437 345/157 |
| 2011/0096322 | A1* | 4/2011 | Nakanishi | G06F 3/0428 356/51 |
| 2020/0210002 | A1* | 7/2020 | Kim | G06F 3/046 |

* cited by examiner

*Primary Examiner* — Richard A Hansell, Jr.
(74) *Attorney, Agent, or Firm* — Xsensus LLP

(57) ABSTRACT

The present disclosure provides a method and a device for adjusting a multimedia blackboard, a medium, and an electronic apparatus. In the present disclosure, a three-dimensional model of a target space is established, and a multimedia blackboard is adjusted by using the three-dimensional model and determining distribution positions of students in a classroom to ensure that the students can watch the multimedia blackboard better and reduce the fatigue feeling about the class, which helps in improving an efficiency of having the class.

9 Claims, 7 Drawing Sheets

METHOD AND DEVICE FOR ADJUSTING MULTIMEDIA BLACKBOARD, MEDIUM, AND ELECTRONIC APPARATUS

CROSS-REFERENCE TO RELATED APPLICATION

This application claims the benefit of Chinese Patent Application No. 202010182765.7 filed on Mar. 17, 2020 in the National Intellectual Property Administration of China, the whole disclosure of which is incorporated herein by reference.

TECHNICAL FIELD

The present disclosure relates to a field of computer, and in particular, to a method and device for adjusting a multimedia blackboard, medium, and electronic apparatus.

BACKGROUND

A traditional blackboard is a plane on which writing can be made repeatedly, and the surface of the board is hard. A blackboard is a writing tool on which writing and erasing can be made repeatedly, and normally used for teaching, conference discussing, or personal and family notes. With the popularization of computer technology, multimedia computer-assisted teaching apparatus has become a common apparatus in classrooms of education institutions. Because the multimedia content must be prepared before a class starts, and thus it is relatively complicated to edit the multimedia content when giving the class. Therefore, multimedia blackboards come into being. The multimedia blackboard combines the functions of multimedia and the functions of traditional blackboards, so that not only a blackboard-writing may be made on the multimedia blackboard, but also multimedia materials may be played on the multimedia blackboard. For example, a multimedia blackboard includes two display areas with one display area displaying a lecture video showing the whole body of the teacher, and the other display area displaying a lecture content of the teacher, such as a PPT lecture content.

Due to a high height and large area of a multimedia blackboard, it is inevitable for a light incident on the multimedia blackboard to be subjected to diffuse reflection and/or specular reflection due to surface material. When the multimedia blackboard is viewed from a certain angle, due to a large intensity of specular reflection, a viewer will feel very dazzling when viewing the multimedia blackboard from such an angle, and cannot see a display content of the multimedia blackboard clearly.

In particular, in a classroom of a university that can accommodate hundreds of people, in order to take care of the listening effect for students in various positions, a fixed position of the multimedia blackboard is more suitable for students in the middle of the classroom to see the display content on the multimedia blackboard comfortably. But when there are only a dozen of students in this classroom listening at the same time, if students are all concentrated in the middle of the classroom, the teacher and students may feel isolated in space, which will degrade the teaching effect.

BRIEF SUMMARY

The summary is provided to introduce concepts in a brief form, which would be further described below in the detailed description. The summary is not intended to indicate key features or essential features of the claimed technical solution, nor is it intended to be used to limit the scope of the claimed technical solution.

The present disclosure provides a method and device for adjusting a multimedia blackboard, medium, and electronic apparatus, which can solve at least one of the technical problems described above. The detailed solutions are as follows.

In one embodiment of the present disclosure, a method for adjusting a multimedia blackboard is provided. The method includes:

determining a valid planar map from a ground projection map of an original horizontal plane in a spatial rectangular coordinate system; the spatial rectangular coordinate system includes: an origin, a horizontal axis, a vertical axis, and a longitudinal axis, the original horizontal plane is a plane determined by the horizontal axis and the vertical axis, and the ground projection map is a projection map of the three-dimensional ground on the original horizontal plane;

analyzing the valid planar map to obtain a planar core coordinate; obtaining a three-dimensional core coordinate based on a preset core height, the planar core coordinate, and the three-dimensional ground;

acquiring at least three three-dimensional board point coordinates, and determining a three-dimensional board plane based on the three-dimensional board point coordinates; the three-dimensional board point coordinates are coordinates corresponding to preset board points on the multimedia blackboard board, wherein the preset board points include a preset key point, and the three-dimensional board point coordinates include a three-dimensional key coordinate corresponding to the preset key point;

generating a three-dimensional key straight-line according to the three-dimensional key coordinate and the three-dimensional core coordinate;

adjusting the multimedia blackboard based on a preset positional relationship between the three-dimensional key straight-line and the three-dimensional board plane.

According to an embodiment of the present disclosure, in an aspect, the present disclosure provides a device for adjusting a multimedia blackboard, including:

a unit for determining a valid planar map, configured to determine a valid planar map from a ground projection map of an original horizontal plane in a spatial rectangular coordinate system; the spatial rectangular coordinate system includes: an origin, a horizontal axis, a vertical axis, and a longitudinal axis, the original horizontal plane is a plane determined by the horizontal axis and the vertical axis, and the ground projection map is a projection map of the three-dimensional ground on the original horizontal plane;

a unit for analyzing the valid planar map, configured to analyze the valid planar map to obtain a planar core coordinate;

a unit for obtaining a three-dimensional core coordinate, configured to obtain a three-dimensional core coordinate based on a preset core height, the planar core coordinate, and the three-dimensional ground;

a unit for determining a three-dimensional board plane, configured to acquire at least three three-dimensional board point coordinates, and determine a three-dimensional board plane based on the three-dimensional board point coordinates; the three-dimensional board point coordinates are coordinates corresponding to preset board points on the multimedia blackboard board, wherein the preset board points include a preset key point, and the three-dimensional board point coordinates include a three-dimensional key coordinate corresponding to the preset key point;

a unit for generating a three-dimensional key straight-line, configured to generate a three-dimensional key straight-line according to the three-dimensional key coordinate and the three-dimensional core coordinate;

a unit for adjusting the multimedia blackboard, configured to adjust the multimedia blackboard based on a preset positional relationship between the three-dimensional key straight-line and the three-dimensional board plane.

According to an embodiment of the present disclosure, in an aspect, the present disclosure provides a computer-readable storage medium with a computer program stored thereon, which implements the method for adjusting a multimedia blackboard as described in any one of the aspect upon being executed by a processor.

According to an embodiment of the present disclosure, in an aspect, the present disclosure provides an electronic apparatus including: one or more processors; a storage device configured to store one or more programs, which enable the one or more processors to implement the method for adjusting a multimedia blackboard as described in any one of the aspect upon being executed by the one or more processors.

Compared with the prior art, the foregoing solutions in the embodiments of the present disclosure have at least the following technical effects:

the present disclosure provides a method and device for adjusting a multimedia blackboard, medium, and electronic apparatus. In the present disclosure, a three-dimensional model of a target space is established, and a multimedia blackboard is adjusted by using the three-dimensional model and determining distribution positions of students in a classroom to ensure that the students can watch the multimedia blackboard better and reduce the fatigue feeling about the class, which helps in improving an efficiency of having the class.

BRIEF DESCRIPTION OF THE DRAWINGS

The above and other features, advantages, and aspects of the embodiments of the present disclosure will become more obvious with reference to the drawings and the following embodiments. In the drawings, the same or similar reference numbers indicate the same or similar elements. It should be understood that the drawings are schematic and parts and elements are not necessarily drawn to scale. In the drawings.

DETAILED DESCRIPTION

Figure 1:
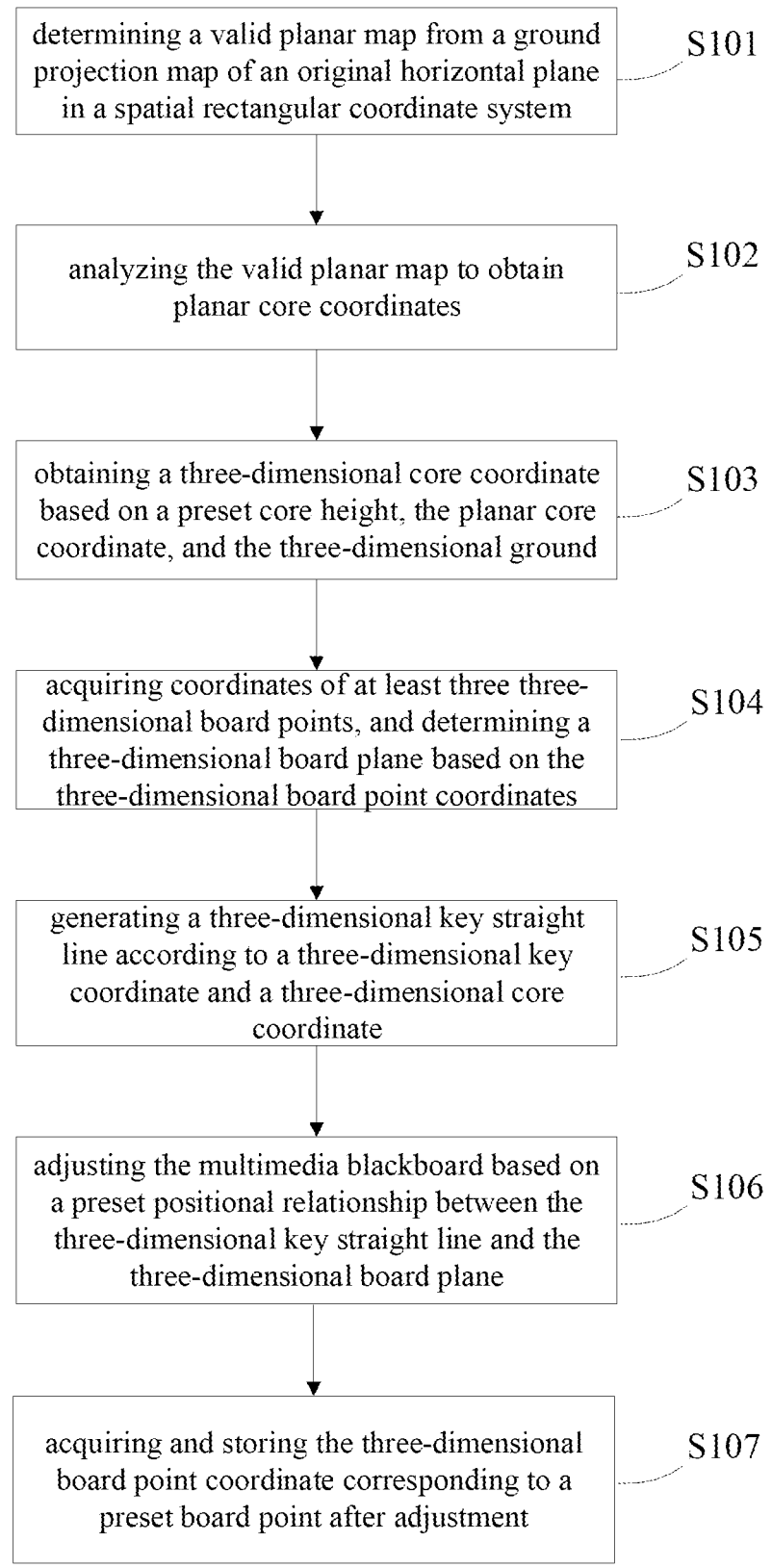
FIG. 1 shows a flowchart of a method for adjusting a multimedia blackboard according to an embodiment of the present disclosure.

Hereinafter, embodiments of the present disclosure will be described in more detail with reference to the drawings. Although some embodiments of the present disclosure are shown in the drawings, it should be understood that the present disclosure may be implemented in various forms and should not be construed as being limited to the embodiments set forth herein, but rather these embodiments are provided for more thorough and complete understanding of this disclosure. It should be understood that the drawings and embodiments of the present disclosure are only for exemplary purposes, and are not intended to limit the claimed scope of the present disclosure.

It should be understood that the steps recorded in this publicly available method implementation modality can be performed in different order and/or in parallel. In addition, the method implementation may include additional steps and/or omit the steps shown for execution. The scope of this disclosure is unrestricted in this respect.

The term "include" used in this paper and its deformation is open to include, i.e. "include but not limited to". The term "based" is "at least partially based". The term "one embodiment" means "at least one embodiment"; the term "another embodiment" means "at least one other embodiment"; and the term "some embodiments" means "at least some embodiments". Relevant definitions of other terms are given in the following description.

It is important to note that the concepts of "first" and "second" mentioned in this disclosure are only used to distinguish between different devices, modules or units and are not used to define the order or interdependence of the functions performed by these devices, modules or units.

It should be noted that the modification of "one", "multiple" mentioned in this disclosure is indicative rather than restrictive, and the technical staff in this field should understand that it should be understood as "one or more" unless otherwise specified in the context.

The names of messages or information that interact with multiple devices in this public implementation are used only for illustrative purposes and not for limiting the scope of such messages or information.

Hereinafter, embodiments of the present disclosure will be described in detail with reference to the drawings.

The embodiment provided by the present disclosure is an embodiment of a method for adjusting a multimedia blackboard.

The embodiments of the present disclosure will be described in detail below with reference to FIGS. 1 to 5.

To adjust a multimedia blackboard to a preset position in a target space, e.g., a classroom, a spatial rectangular coordinate system needs to be first established in the target space. Then, a three-dimensional model may be established, that is, a target in the target space may be incorporated into the spatial rectangular coordinate system to be under management. For example, a multimedia blackboard in a classroom may be under management in a spatial rectangular coordinate system. Therefore, before adjusting a multimedia blackboard, the embodiments of the present disclosure provide a step of establishing a three-dimensional model of a target space, including the following steps:

Step S100-1, determining a spatial rectangular coordinate system, determining three-dimensional board point coordinates according to a preset board point, and determining a three-dimensional key coordinate according to the preset key point.

The spatial rectangular coordinate system includes: an origin, a horizontal axis, a vertical axis, and a longitudinal axis. The original horizontal plane is a plane determined by the horizontal axis and the vertical axis. For example, with reference to FIG. 4 and FIG. 5, the horizontal axis is x axis, the vertical axis is y axis, and the longitudinal axis is z axis; the original horizontal plane is xoz plane.

An origin of the spatial rectangular coordinate system may be set at any position in space.

The preset board point may be a point for determining a board plane of the multimedia blackboard. Therefore, at least three preset board points may be set on the board of the multimedia blackboard. The three-dimensional board point coordinates are the coordinates corresponding to the preset board points on the multimedia blackboard board. The preset board point includes a preset key point, and the three-dimensional board point coordinates include three-dimensional key coordinates corresponding to the preset key point. The preset key point in the embodiment of the present disclosure is a point where a concentration of the student's sights on the multimedia blackboard is relatively high. For example, the preset key point is a symmetrical center of the board of the multimedia blackboard. When an origin of the spatial rectangular coordinate system is established on the multimedia blackboard, the three-dimensional board point coordinates of the preset board point in the spatial rectangular coordinate system may be determined by measurement when the three-dimensional model is initialized.

Step S100-2, acquiring, by multi-view cameras, a plurality of target space images simultaneously, and determining ground intersection point positions of at least four ground intersection points in the target space image.

The multi-view cameras include at least two cameras for measuring a distance of a designated target point in the target space, and then generating a three-dimensional model of the target space.

Figure 2:
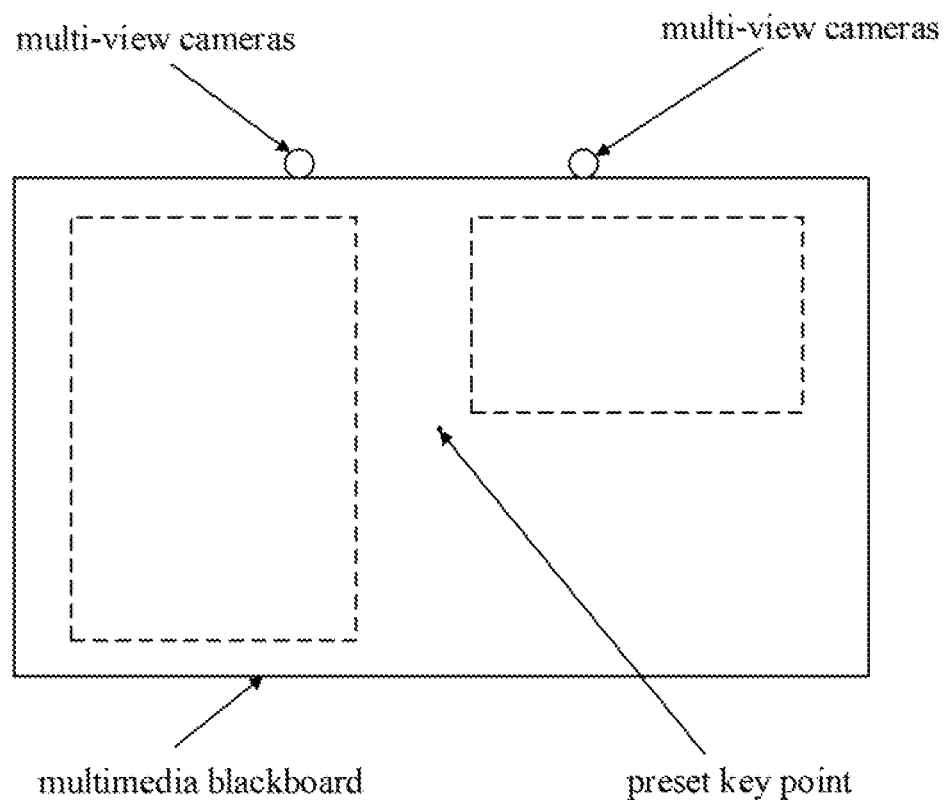
FIG. 2 illustrates a front view of a multimedia blackboard according to a method of adjusting a multimedia blackboard according to an embodiment of the present disclosure.
Figure 3:
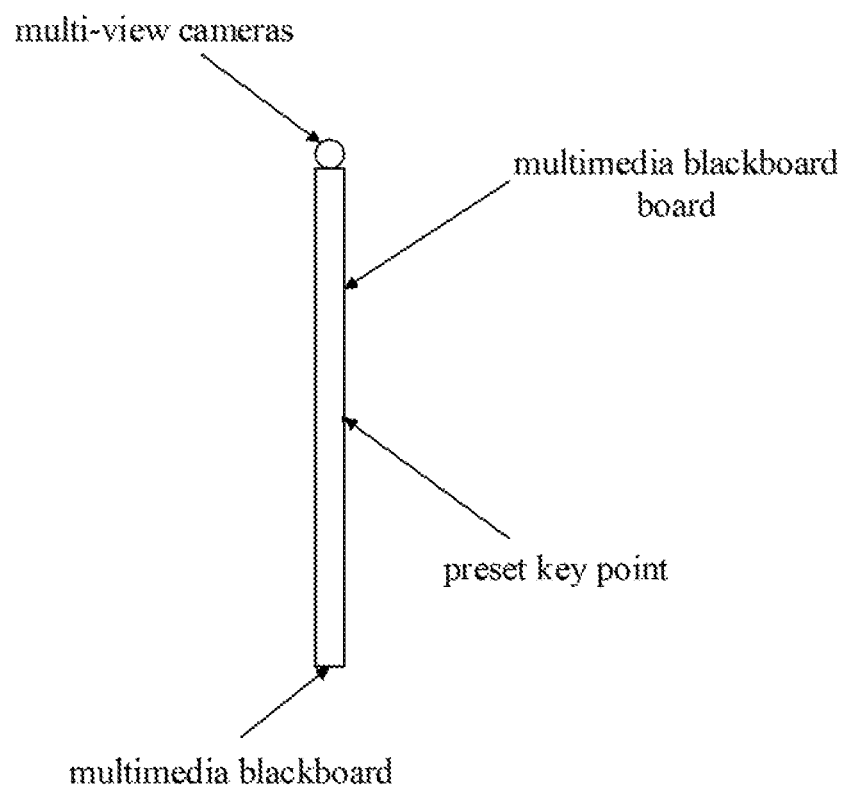
FIG. 3 illustrates a side view of a multimedia blackboard according to a method of adjusting a multimedia blackboard according to an embodiment of the present disclosure.

With reference to FIG. 2 and FIG. 3, upon building a three-dimensional model, the multimedia blackboard includes the multi-view cameras arranged horizontally in line, and the optical axis of the multi-view cameras are parallel to the original horizontal plane and are perpendicular to the board of the multimedia blackboard board. That is to say, the multimedia blackboard board is perpendicular to the original horizontal plane. For example, the multi-view cameras are fixed on top of the multimedia blackboard, or the multi-view cameras are hidden in the board of the multimedia blackboard.

In some embodiments, since the three-dimensional model of the target space is established by the multi-view cameras, to facilitate calculation, the leftmost camera in the shooting direction of the multi-view cameras is determined as the origin of the spatial rectangular coordinate system.

The ground intersection point is a point on an intersection line where the target space ground and at least one or more target space planes intersect at the same time. For example, with reference to FIG. 4 and FIG. 5, point b or point c are the intersection points of straight lines formed by the intersection of the target space ground and two walls; point a or point d is a point on a straight line formed by the intersection of the target space ground and a wall, respectively. A shape of the target space ground may include a straight line and/or a curve.

The determination on the ground intersection point position is to determine the three-dimensional ground in the spatial rectangular coordinate system, and then determine the position of the target in the spatial rectangular coordinate system by the height of the target in the three-dimensional ground and the target space from the three-dimensional ground, thereby incorporating the target into the spatial rectangular coordinate system to be under management. Therefore, in order to ensure the validation of the three-dimensional ground, the ground intersection points are limited to a range of the target space ground and within a range of the multi-view cameras. For example, the eyes of students sitting on seats in the classroom may be used as targets and be under management in a spatial rectangular coordinate system. If the floor of the classroom is stepped, the ground intersection point position may be determined according to the shape of the steps, or four ground intersection point positions may be determined according to the slope of the steps, so as to determine that the three-dimensional ground is a plane.

The ground intersection point position includes a pixel coordinate of the ground intersection point in the target space image.

Step S100-3: generating a three-dimensional ground intersection point coordinate corresponding to the ground intersection point according to the target space image, the ground intersection point position, and lens information of the multi-view cameras. The lens information includes focal length of lens of a camera.

Step S100-4, generating a three-dimensional ground according to a preset intersection point connection relationship and a three-dimensional ground intersection point coordinate.

Figure 4:
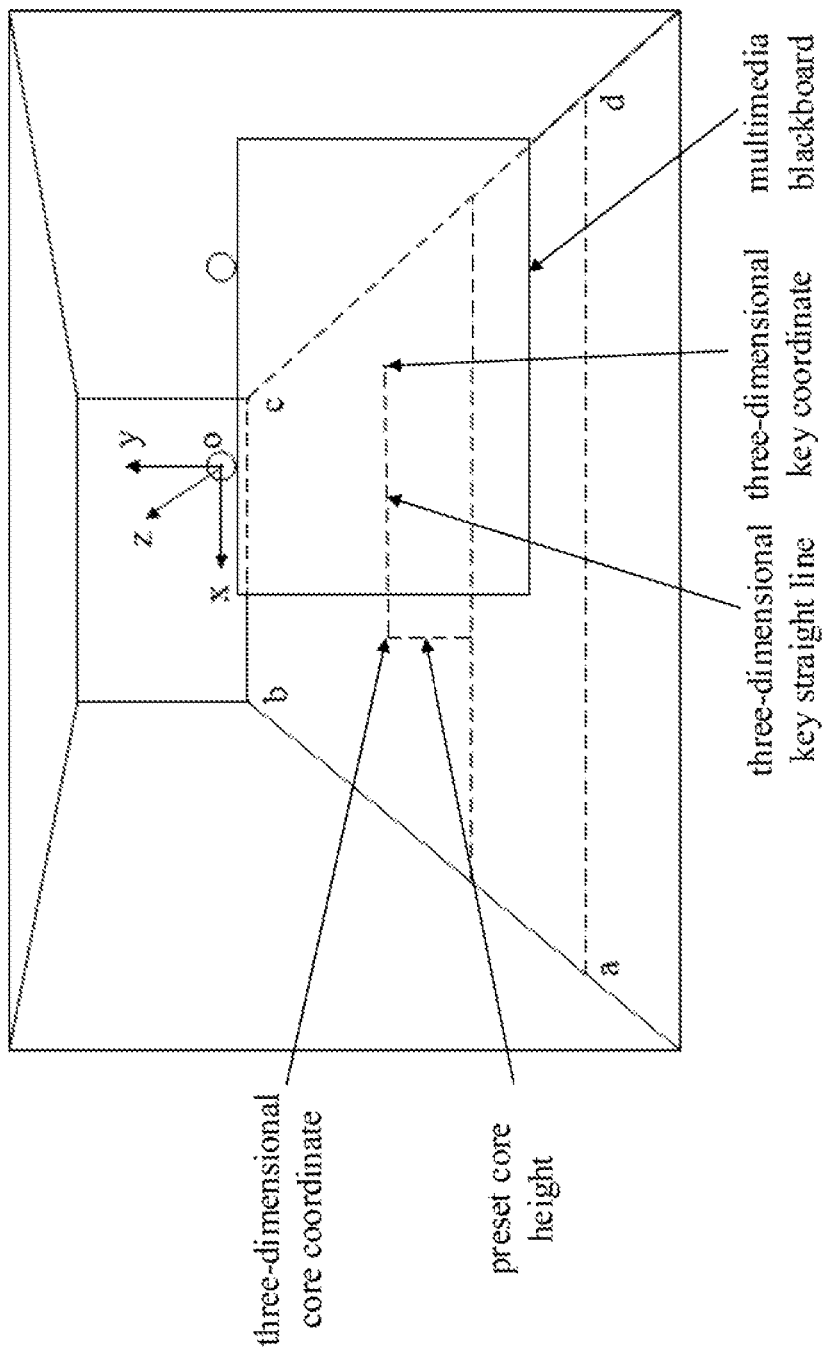
FIG. 4 illustrates a front view of a target space according to a method of adjusting a multimedia blackboard according to an embodiment of the present disclosure.
Figure 5:
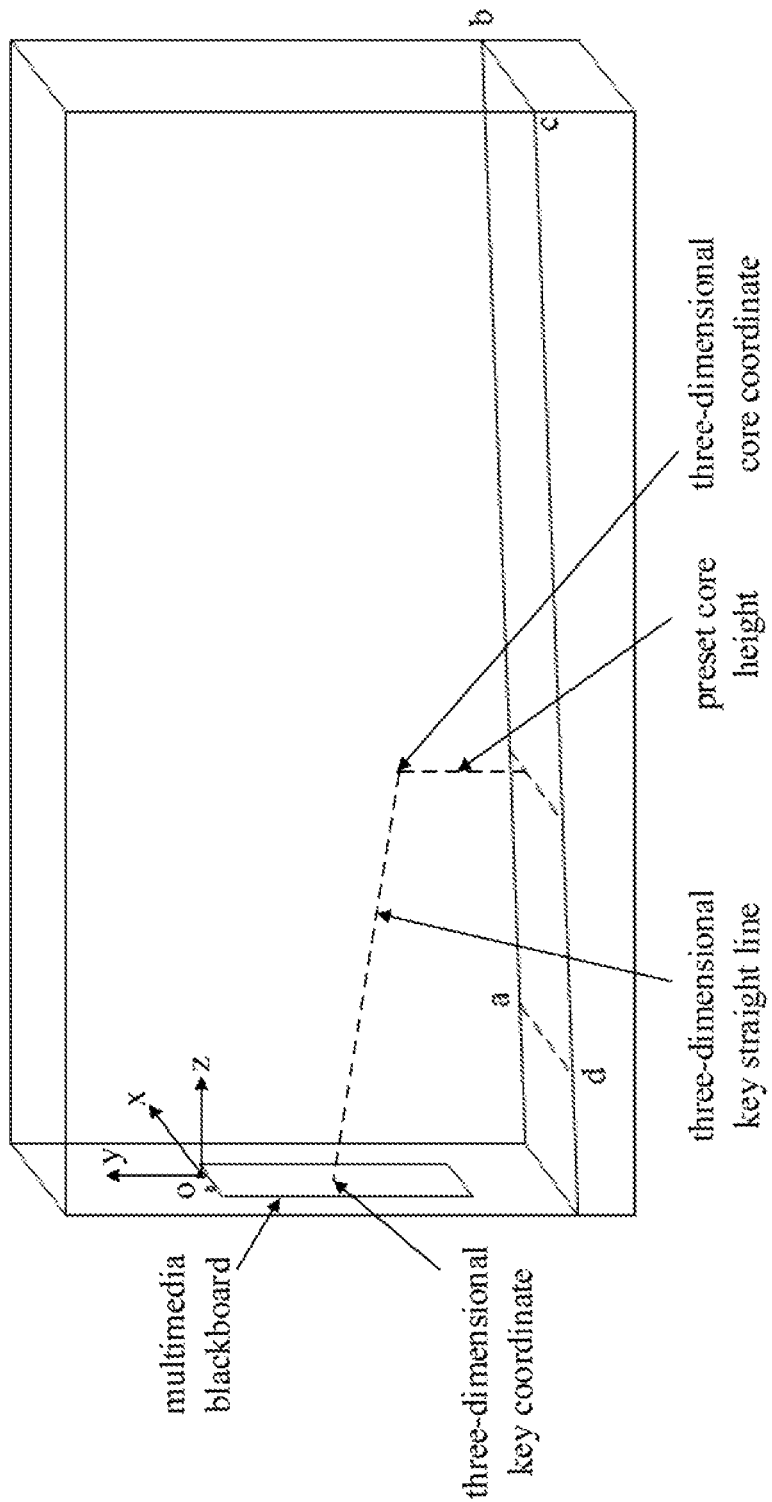
FIG. 5 illustrates a side view of a target space according to a method of adjusting a multimedia blackboard according to an embodiment of the present disclosure.

For example, with reference to FIG. 4 and FIG. 5, points a, b, c, and d are ground intersection points determined on a ground with a slope, respectively, and a three-dimensional ground of abcd is generated according to the ground intersection points described above.

A three-dimensional model of the specific target space may be established with the above steps, and the embodiments of the present disclosure adjusts a multimedia blackboard based on the three-dimensional model. With reference to FIG. 1, the following steps are included:

Step S101, determining a valid planar map from a ground projection map of an original horizontal plane in a spatial rectangular coordinate system.

The ground projection map is a projection area of a three-dimensional ground in the original horizontal plane.

The valid planar map is used to define a valid area in the ground projection map, and parameters of a multimedia blackboard are adjusted and generated according to the valid planar map. For example, the valid planar map is used to define a sitting area of the students in the classroom. The valid planar map combined with the planar distribution of the desks and chairs in the classroom may prompt students how to sit, thereby a better position for looking at the multimedia blackboard may be obtained.

The determining a valid planar map from a ground projection map of an original horizontal plane in a spatial rectangular coordinate system includes the following steps:

Step S101-1, obtaining a two-dimensional map of the ground projection map according to a preset mapping relationship.

The ground projection map in the spatial rectangular coordinate system is converted into a planar figure. For example, the preset mapping relationship is a proportional scaling relationship, the three-dimensional ground is a rectangular figure, and the ground projection map is also a rectangular figure. After the proportional scaling, the two-dimensional map is also a rectangular figure. Step S101-2, determining a two-dimensional valid map in the two-dimensional map.

The two-dimensional valid map may be drawn with a preset graphic tool. The graphic tool includes: a rectangular figure tool, an ellipse figure tool, and/or a polygon figure tool. For example, with the ellipse figure tool, a two-dimensional valid map is a circular graph drawn in the two-dimensional map.

Step S101-3, drawing the two-dimensional valid map to the ground projection map according to a preset mapping relationship.

A planar figure is converted to a figure in the original horizontal plane of the spatial rectangular coordinate system. The above steps avoid the tedious in performing drawing in the spatial rectangular coordinate system.

Step S102: analyzing the valid planar map to obtain planar core coordinates.

The planar core coordinate is a coordinate of a core point in the valid planar map. With the planar core coordinates, a position for better looking at the multimedia blackboard may be obtained.

In some embodiments, the valid planar map includes a center-symmetric figure, and the planar core coordinate includes a plane-symmetric center coordinate of the center-symmetric figure.

In the plane, a figure may be rotated by 180° around a point. If the rotated figure can coincide with the original figure, then this figure is called the center-symmetric figure, and this point is called a symmetry center. The coordinates of the symmetry center in the plane are called planar symmetry center coordinate.

The analyzing the valid planar map to obtain planar core coordinates includes the following steps:

Step S102-1: analyzing the center-symmetric figure to obtain a planar symmetry center coordinate of the center-symmetric figure.

Step S103: obtaining a three-dimensional core coordinate based on a preset core height, the planar core coordinate, and the three-dimensional ground.

For example, the preset core height is a height of eyes of a student sitting in the classroom from the ground.

The object of this step is to obtain a better position coordinates for looking at the multimedia blackboard within a specified range in the spatial rectangular coordinate system. That is, the planar core coordinate in the original horizontal plane is converted into a position coordinate corresponding to a student's eyes in the spatial rectangular coordinate system.

The obtaining a three-dimensional core coordinate based on a preset core height, the planar core coordinate, and the three-dimensional ground includes the following steps:

Step S103-1, obtaining a corresponding ground core coordinate from the three-dimensional ground based on the horizontal and vertical coordinates of the planar core coordinates.

Step S103-2: calculating a sum of a longitude coordinate of the ground core coordinate and a preset core height to obtain a longitude coordinate of the three-dimensional core coordinate.

The horizontal coordinate of the three-dimensional core coordinate is equal to the horizontal coordinate of the ground core coordinate, and the vertical coordinate of the three-dimensional core coordinate is equal to the vertical coordinate of the ground core coordinate.

Step S104: acquiring coordinates of at least three three-dimensional board points, and determining a three-dimensional board plane based on the three-dimensional board point coordinates.

In the spatial rectangular coordinate system, the three-dimensional board plane is used to represent a plane of the multimedia blackboard board.

The three-dimensional board point coordinate includes a three-dimensional key coordinate corresponding to a preset key point.

Step S105: generating a three-dimensional key straight line according to a three-dimensional key coordinate and a three-dimensional core coordinate.

The three-dimensional key coordinate is a coordinate of a preset key-point in the spatial rectangular coordinate system of the board of the multimedia blackboard.

Step S106: adjusting the multimedia blackboard based on a preset positional relationship between the three-dimensional key straight line and the three-dimensional board plane.

In some embodiments, the preset positional relationship includes the three-dimensional key straight line is perpendicular to the three-dimensional board plane and intersects the three-dimensional key coordinate.

The adjusting the multimedia blackboard based on a preset position relationship between the three-dimensional key straight line and the three-dimensional board plane includes the following steps:

Step S106-1, adjusting the multimedia blackboard so that the three-dimensional key straight line is perpendicular to the three-dimensional board surface plane and intersects with the three-dimensional key coordinate.

In other words, eyes at the three-dimensional core coordinate have better effect in looking at the multimedia blackboard.

After adjusting the multimedia blackboard, the method further includes the following steps:

Step S107: acquiring and storing the three-dimensional board point coordinate corresponding to a preset board point after adjustment.

Since a position of the preset board point may change after each adjustment of the multimedia blackboard, in order to ensure that a valid three-dimensional board point coordinates and a three-dimensional key coordinate may be obtained next time the multimedia blackboard is adjusted, in the embodiments of the present disclosure, a new three-dimensional board point coordinate of the preset board point in the spatial rectangular coordinate system may be recalculated after each adjustment. When adjusting, the three-dimensional board point coordinate by calculating a preset board point adjustment movement trajectory.

In the embodiments of the present disclosure, a three-dimensional model of a target space is established, and a multimedia blackboard is adjusted by using the three-dimensional model and determining distribution positions of students in a classroom to ensure that the students can watch the multimedia blackboard better and reduce the fatigue feeling about the class, which helps in improving an efficiency of having the class.

Corresponding to the embodiment provided by the present disclosure, the present disclosure further provides an embodiment, that is, a device for adjusting a multimedia blackboard. Since the embodiment is similar to the other embodiment, the description would be relatively simple. The description of related parts may refer to the corresponding description in the embodiment. The embodiment related to the device described below are only schematic.

Figure 6:
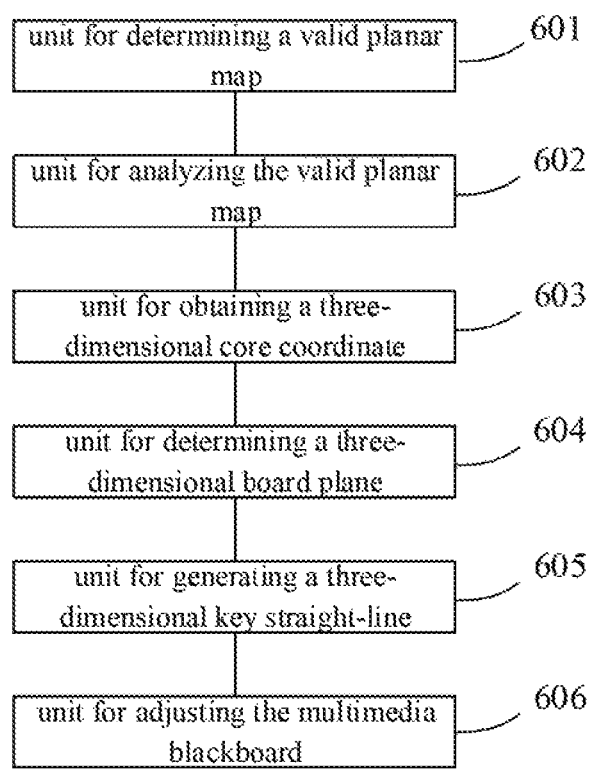
FIG. 6 illustrates a block diagram of a device for adjusting a multimedia blackboard according to an embodiment of the present disclosure.

FIG. 6 illustrates an embodiment of a device for adjusting a multimedia blackboard provided by the present disclosure.

With reference to FIG. 6, the present disclosure provides a device for adjusting a multimedia blackboard, including: a unit for determining a valid planar map 601, a unit for analyzing the valid planar map 602, a unit for obtaining a three-dimensional core coordinate 603, a unit for determining a three-dimensional board plane 604, a unit for generating a three-dimensional key straight-line 605, a unit for adjusting the multimedia blackboard 606.

The unit for determining a valid planar map 601 is configured to determine a valid planar map from a ground projection map of an original horizontal plane in a spatial rectangular coordinate system; the spatial rectangular coordinate system includes: an origin, a horizontal axis, a vertical axis, and a longitudinal axis, the original horizontal plane is a plane determined by the horizontal axis and the vertical axis, and the ground projection map is a projection map of the three-dimensional ground on the original horizontal plane;

The unit for analyzing the valid planar map 602 is configured to analyze the valid planar map to obtain a planar core coordinate.

The unit for obtaining a three-dimensional core coordinate 603 is configured to obtain a three-dimensional core coordinate based on a preset core height, the planar core coordinate, and the three-dimensional ground.

The unit for determining a three-dimensional board plane 604 is configured to acquire at least three three-dimensional board point coordinates, and determine a three-dimensional board plane based on the three-dimensional board point coordinates; the three-dimensional board point coordinates are coordinates corresponding to preset board points on the multimedia blackboard board, wherein the preset board points include a preset key point, and the three-dimensional board point coordinates include a three-dimensional key coordinate corresponding to the preset key point.

The unit for generating a three-dimensional key straight-line 605 is configured to generate a three-dimensional key straight-line according to the three-dimensional key coordinate and the three-dimensional core coordinate.

The unit for adjusting the multimedia blackboard 606 is configured to adjust the multimedia blackboard based on a preset positional relationship between the three-dimensional key straight-line and the three-dimensional board plane.

In some embodiments, the valid planar map includes a center-symmetric figure, and the planar core coordinate includes a plane-symmetric center coordinate of the center-symmetric figure.

The unit for analyzing the valid planar map 602 includes:
a subunit for analyzing the center-symmetric figure, configured to analyze the center-symmetric figure to obtain a planar symmetry center coordinate of the center-symmetric figure.

In some embodiments, the unit for obtaining a three-dimensional core coordinate 603 includes:
a subunit for obtaining a ground core coordinate, configured to obtain a ground core coordinate from the three-dimensional ground based on the horizontal and vertical coordinates of the planar core coordinates.

a subunit for obtaining a three-dimensional core coordinate, configured to calculate a sum of a longitude coordinate of the ground core coordinate and a preset core height to obtain a longitude coordinate of the three-dimensional core coordinate; wherein, the horizontal coordinate of the three-dimensional core coordinate is equal to the horizontal coordinate of the ground core coordinate, and the vertical coordinate of the three-dimensional core coordinate is equal to the vertical coordinate of the ground core coordinate.

In some embodiments, the unit for determining a valid planar map 601 includes:

a subunit for obtaining a two-dimensional map, configured to obtain a two-dimensional map of the ground projection map according to a preset mapping relationship;

a subunit for determining a two-dimensional valid map, configured to determine a two-dimensional valid map in the two-dimensional map;

a subunit for drawing the two-dimensional valid map, configured to draw the two-dimensional valid map to the ground projection map according to a preset mapping relationship.

In some embodiments, the preset positional relationship includes the three-dimensional key straight line is perpendicular to the three-dimensional board plane and intersects the three-dimensional key coordinate.

The unit for adjusting the multimedia blackboard 606 includes:
a subunit for adjusting the multimedia blackboard, configured to adjust the multimedia blackboard so that the three-dimensional key straight line is perpendicular to the three-dimensional board surface plane and intersects with the three-dimensional key coordinate.

In some embodiments, the device further includes:
a unit for storing the three-dimensional board point coordinate, configured to acquire and store the three-dimensional board point coordinate corresponding to a preset board point after adjustment.

In some embodiments, the device further includes: a unit for establishing a three-dimensional model.

The unit for establishing a three-dimensional model includes:
a subunit for determining a spatial rectangular coordinate system and three-dimensional board point coordinates according to a preset board point, and determining a three-dimensional key coordinate according to the preset key point;

a subunit for determining ground intersection point position, configured to acquire, by multi-view cameras, a plurality of target space images simultaneously, and determining ground intersection point positions of at least four ground intersection points in the target space image of at least four ground intersection points in the target space image; wherein the multimedia blackboard includes the multi-view cameras arranged horizontally in line, and the optical axis of the multi-view cameras are parallel to the original horizontal plane and are perpendicular to the board of the multimedia blackboard board; the ground intersection point is a point on an intersection line where the target space ground and at least one or more target space planes intersect at the same time;

a subunit for generating a three-dimensional ground intersection point coordinate, configured to generate a three-dimensional ground intersection point coordinate corresponding to the ground intersection point according to the target space image, the ground intersection point position, and lens information of the multi-view cameras;

a subunit for generating a three-dimensional ground, configured to generate a three-dimensional ground according to a preset intersection point connection relationship and a three-dimensional ground intersection point coordinate.

In the embodiments of the present disclosure, a three-dimensional model of a target space is established, and a multimedia blackboard is adjusted by using the three-dimensional model and determining distribution positions of students in a classroom to ensure that the students can watch the multimedia blackboard better and reduce the fatigue feeling about the class, which helps in improving an efficiency of having the class.

The embodiments of the present disclosure provide an embodiment, that is, an electronic apparatus for a method for adjusting a multimedia blackboard. The electronic apparatus includes: at least one processor, and a storage device, which is communicatively connected with the at least one processor, and configured to store instructions executable by the at least one processor, which enable the at least one processor to implement the method for adjusting a multimedia blackboard as described in the embodiment, upon being executed by the at least one processor.

The embodiments of the present disclosure provide a embodiment, that is, a computer storage medium for adjusting a multimedia blackboard. The computer storage medium stores computer-executable instructions that can perform the method for adjusting a multimedia blackboard as described in the embodiment.

Figure 7:
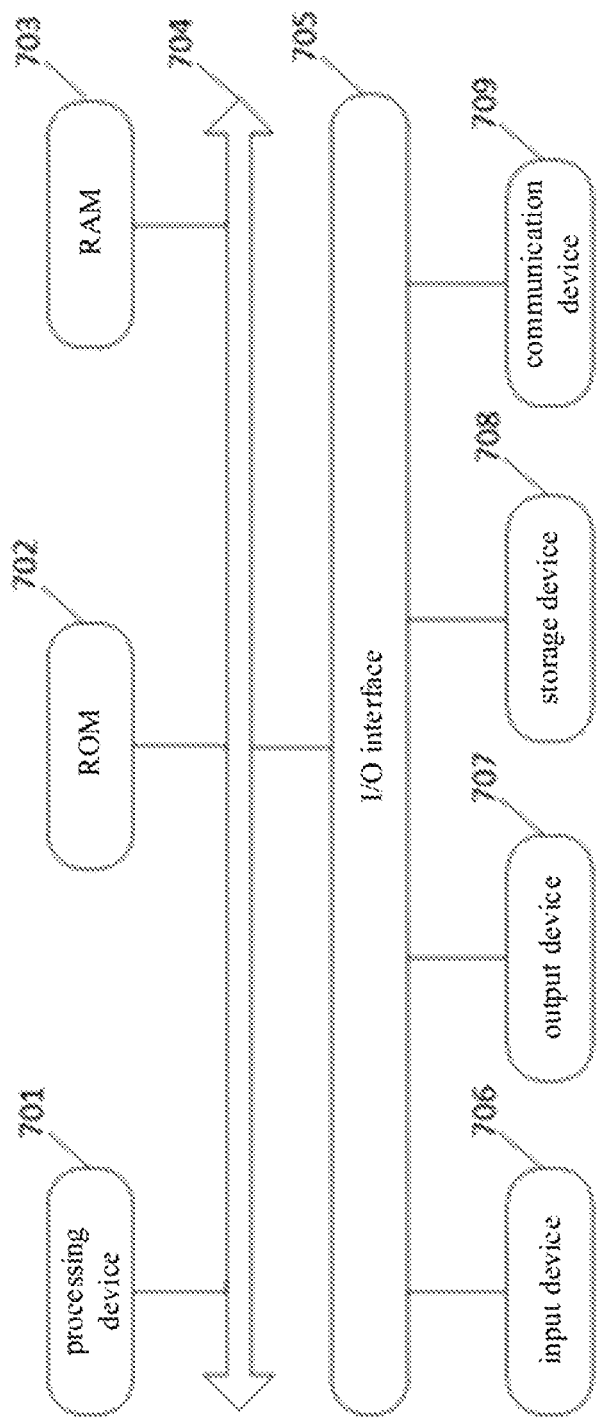
FIG. 7 is a schematic diagram showing a connection structure of an electronic apparatus according to an embodiment of the present disclosure.

With reference to FIG. 7, which illustrates a schematic structural diagram showing a connection structure of an electronic apparatus suitable for implementing an embodiment of the present disclosure. The terminal apparatus in the embodiment of the present disclosure may include, but is not limited to, mobile terminals, such as a mobile phone, a notebook computer, a digital broadcast receiver, a PDA (Personal Digital Assistant), a PAD (Tablet Computer), a PMP (Portable Multimedia Player), a vehicle terminal (for example car navigation terminal) and stationary terminals such as digital TV, desktop computer. The electronic apparatus shown in FIG. 7 is only an example, and should not impose any limitation on the functions and scope of use of the embodiments of the present disclosure.

As shown in FIG. 7, the electronic apparatus may include a processing device 701, such as a central processing unit, a graphics processor, which may perform various actions and processing according to programs stored in a read-only memory (ROM) 702 or programs loaded from a storage device 708 to a random access memory (RAM) 703. Various programs and data necessary for the operations of the electronic apparatus may further stored in the RAM 703. The processing device 701, the ROM 702, and the RAM 703 are connected to each other through a bus 704. An input/output (I/O) interface 705 is further connected to the bus 704.

Generally, the following devices may be connected to the I/O interface 705: an input device 706, including e.g., touch screen, touch pad, keyboard, mouse, camera, microphone, accelerometer, gyroscope, etc.; an output device 707 including e.g., a liquid crystal display (LCD), speakers, vibrators, etc.; a storage device 708 including e.g., a magnetic tape, a hard disk, and the like; and a communication device 709. The communication device 709 may allow the electronic apparatus to perform wireless or wired communication with other apparatuses to exchange data. Although FIG. 7 shows an electronic apparatus having various devices, it should be understood that it is not required to implement or have all the devices as shown. More or fewer devices may be implemented or provided alternatively.

In particular, according to an embodiment of the present disclosure, the process described above with reference to the flowchart may be implemented as a computer software program. For example, embodiments of the present disclosure include a computer program product including a computer program carried on a non-transitory computer-readable medium. The computer program contains program codes for performing a method shown in the flowcharts. In such an embodiment, the computer program may be downloaded and installed from network through the communication device 709, or installed from the storage device 708, or installed from the ROM 702. When the computer program is executed by the processing device 701, the above functions defined in the method of the embodiments of the present disclosure are executed.

It should be noted that this disclosure of the above computer readable media may be a computer readable signal medium or a computer readable storage medium or any combination of the above. Computer readable storage media such as a system, device or device that can be, but not limited to, electronic, magnetic, optical, electromagnetic, infrared, or semiconductor, or any combination of more than one. More specific examples of computer readable storage media may include, but are not limited to: electrical connections with one or more conductors, portable computer disks, hard drives, random access memory (RAM), read-only memory (ROM), erasable programmable read-only memory (EPROM or flash), optical fibers, portable compact disk read-only memory (CD-ROM), optical memory devices, magnetic memory devices, or any of the appropriate combinations described above. In this disclosure, a computer-readable storage medium may be any tangible medium containing or storing a program that may be directed for use by or in combination with an execution system, device or device. In this disclosure, the computer readable signal medium may include data signals propagated in the baseband or as part of the carrier, which carry computer readable program code. Such propagated data signals can take many forms, including but not limited to electromagnetic signals, optical signals, or any suitable combination of the above. A computer-readable signal medium may also be any computer-readable medium other than a computer-readable storage medium which may transmit, propagate or transmit a program for use or in combination with an instruction-executing system, device or device. Program code contained on a computer readable medium may be transmitted with any appropriate medium, including but not limited to: wires, optical cables, RF (rf), etc., or any suitable combination of the above.

In some embodiments, the client, server may communicate using any currently known or future developed network protocol such as the HTTP (hypertext transfer protocol, hypertext transfer protocol) and may interconnect with digital data communications (e.g., communication networks) of any form or medium. Examples of communication networks include local area networks ("LAN""), wide area networks ("WAN""), internet networks (e.g., internet), and end-to-end networks (e.g., ad hoc end-to-end networks), as well as any currently known or future developed networks.

The computer readable medium mentioned above may be contained in the electronic device mentioned above; It may also exist separately without being fitted to the electronic device.

One or more programming languages, or combinations thereof, can be used to code computer programs used to perform operations in this disclosure, including, but not limited to, object-oriented programming languages such as Java, Smalltalk, and conventional procedural programming languages such as "C" languages or similar programming languages. Program code can be executed completely on the user computer, partially on the user computer, as a separate package, partially on the user computer, or completely on the remote computer or server. Where a remote computer is involved, a remote computer can be connected to a user computer through any kind of network—including a local area network (LAN) or a wide area network (WAN)—or to an external computer (e.g. via the Internet using an Internet service provider).

Flowcharts and block diagrams in the attached drawings illustrating the possible implementation architecture, functions and operations of systems, methods and computer program products in accordance with the various embodiments disclosed herein. At this point, each box in a flow chart or block diagram can represent a module, program segment, or part of a code that contains one or more executable instructions for implementing a specified logical function. It should also be noted that in some of the replacement implementations, the functions marked in the box can also occur in a different order from those marked in the accompanying drawings. For example, two boxes represented consecutively can actually be executed essentially in parallel, and sometimes in reverse order, depending on the function involved. It is also important to note that each box in the block diagram and/or flow chart, as well as a combination of boxes in the block diagram and/or flow chart, can be implemented with a dedicated hardware-based system performing specified functions or operations, or with a combination of dedicated hardware and computer instructions.

The units described in this public embodiment can be implemented either software or hardware. Where the name of the unit does not in some case constitute a qualification of the unit itself.

The functions described above in this paper can be performed at least partially by one or more hardware logic components. Non-restrictive, hardware logic components of the demonstration type that can be used include: field programmable gate arrays (FPGA), dedicated integrated circuits (ASIC), dedicated standard products (ASSP), on-chip systems (SOC), complex programmable logic devices (CPLD), etc.

In the context of this disclosure, a machine readable medium may be a tangible medium that may contain or store programs for use by the instruction execution system, device or device or in combination with the instruction execution system, device or device. Machine readable media can be machine readable signal media or machine readable storage media. Machine readable media may include, but are not limited to, electronic, magnetic, optical, electromagnetic, infrared, or semiconductor systems, devices or devices of any suitable combination of the above. More specific examples of machine readable storage media will include electrical connections based on one or more lines, portable computer disks, hard drives, random access memory (RAM), read-only memory (ROM), erasable programmable read-only memory (EPROM or flash memory), optical fiber, convenient compact disk read-only memory (CD-ROM), optical storage devices, magnetic storage devices, or any suitable combination of the above.

The above description is only a preferred embodiment of the present disclosure and an explanation of the applied technical principles. Those skilled in the art should understand that the scope of the disclosure involved in this disclosure is not limited to the technical solution of the specific combination of the above technical features, but also covers other technical solutions formed by any combination of the above technical features or their equivalent features without departing from the above-mentioned disclosure concepts. For example, a technical solution formed by replacing the above features with technical features disclosed in the present disclosure (but not limited to) with similar functions.

Furthermore, while operations are depicted in a particular order, this should not be understood as requiring them to be performed in the particular order shown or in sequential order. Multitasking and parallel processing may be advantageous in a certain environment. Similarly, while a number of specific implementation details are included in the above discussion, these should not be interpreted as limiting the scope of this disclosure. Certain features described in the context of a separate embodiment can also be implemented in combination in a single embodiment. In contrast, the various features described in the context of a single embodiment can also be implemented individually or in any appropriate sub-combination in multiple embodiments.

Although this topic has been described in a language specific to structural features and/or methodological logical actions, it should be understood that the subject defined in the accompanying claim is not necessarily limited to the particular features or actions described above. On the contrary, the specific features and actions described above are only an example form of the realization of the claim.

What is claimed is:

1. A method for adjusting a multimedia blackboard, comprising:

determining a valid planar map from a ground projection map of an original horizontal plane in a spatial rectangular coordinate system; the spatial rectangular coordinate system comprises: an origin, a horizontal axis, a vertical axis, and a longitudinal axis, the original horizontal plane is a plane determined by the horizontal axis and the vertical axis, and the ground projection map is a projection map of a three-dimensional ground on the original horizontal plane, the valid planar map defining a sitting area of students in a classroom;

analyzing the valid planar map to obtain a planar core coordinate;

obtaining a three-dimensional core coordinate based on a preset core height, the planar core coordinate, and the three-dimensional ground, the preset core height corresponding to a height of eyes of one of the students in the classroom;

acquiring at least three three-dimensional board point coordinates, and determining a three-dimensional board plane based on the three-dimensional board point coordinates; the three-dimensional board point coordinates are coordinates corresponding to preset board points on a multimedia blackboard board, wherein the preset board points comprise a preset key point, the preset key point is a symmetrical center of the multimedia blackboard board, and the three-dimensional board point coordinates comprise a three-dimensional key coordinate corresponding to the preset key point;

generating a three-dimensional key straight-line according to the three-dimensional key coordinate and the three-dimensional core coordinate, the three-dimensional key straight-line corresponding to a straight-line connecting the three-dimensional key coordinate to the three-dimensional core coordinate; and adjusting the multimedia blackboard so that the three-dimensional key straight-line and the three-dimensional board plane are in a preset positional relationship, wherein before the adjusting a multimedia blackboard, the method further comprises:

acquiring, by multi-view cameras, a plurality of classroom images simultaneously, and determining ground intersection point positions of at least four ground intersection points in the classroom images, wherein the multimedia blackboard comprises the multi-view cameras arranged horizontally in line, and optical axes of the multi-view cameras are parallel to the original horizontal plane and are perpendicular to the multimedia blackboard board; and each of the ground intersection points is a point on an intersection line where the classroom ground and at least one or more classroom planes intersect at the same time;

generating a three-dimensional ground intersection point coordinate corresponding to each of the ground intersection points according to the classroom images, the ground intersection point positions, and lens information of the multi-view cameras; and generating the three-dimensional ground according to a preset intersection point connection relationship and a three-dimensional ground intersection point coordinate.

2. The method according to claim 1, wherein the valid planar map comprises a center-symmetric figure, and the planar core coordinate comprises a plane-symmetric center coordinate of the center-symmetric figure;

the analyzing the valid planar map to obtain a planar core coordinate comprises:

analyzing the center-symmetric figure to obtain a planar symmetry center coordinate of the center-symmetric figure.

3. The method according to claim 1, wherein the obtaining a three-dimensional core coordinate based on a preset core height, the planar core coordinate, and the three-dimensional ground comprises:

obtaining a corresponding ground core coordinate from the three-dimensional ground based on the horizontal and vertical coordinates of the planar core coordinates;

calculating a sum of a longitude coordinate of the ground core coordinate and a preset core height to obtain a longitude coordinate of the three-dimensional core coordinate, wherein the horizontal coordinate of the three-dimensional core coordinate is equal to the horizontal coordinate of the ground core coordinate, and the vertical coordinate of the three-dimensional core coordinate is equal to the vertical coordinate of the ground core coordinate.

4. The method according to claim 1, wherein the determining a valid planar map from a ground projection map of an original horizontal plane in a spatial rectangular coordinate system comprises:

obtaining a two-dimensional map of the ground projection map according to a preset mapping relationship;

determining a two-dimensional valid map in the two-dimensional map;

drawing the two-dimensional valid map to the ground projection map according to a preset mapping relationship.

5. The method according to claim 1, wherein the preset positional relationship comprises the three-dimensional key straight line is perpendicular to the three-dimensional board plane and intersects the three-dimensional key coordinate;

the adjusting the multimedia blackboard comprises:

adjusting the multimedia blackboard so that the three-dimensional key straight line is perpendicular to the three-dimensional board surface plane and intersects with the three-dimensional key coordinate.

6. The method according to claim 1, after the adjusting the multimedia blackboard, the method further comprises:

acquiring and storing the three-dimensional board point coordinate corresponding to a preset board point after adjustment.

7. A device for adjusting a multimedia blackboard, comprising:

a circuitry for determining a valid planar map, configured to determine a valid planar map from a ground projection map of an original horizontal plane in a spatial rectangular coordinate system; the spatial rectangular coordinate system comprises: an origin, a horizontal axis, a vertical axis, and a longitudinal axis, the original horizontal plane is a plane determined by the horizontal axis and the vertical axis, and the ground projection map is a projection map of the three-dimensional ground on the original horizontal plane, the valid planar map defining a sitting area of students in a classroom;

a circuitry for analyzing the valid planar map, configured to analyze the valid planar map to obtain a planar core coordinate;

a circuitry for obtaining a three-dimensional core coordinate, configured to obtain a three-dimensional core coordinate based on a preset core height, the planar core coordinate, and the three-dimensional ground, the preset core height corresponding to a height of eyes of one of the students in the classroom;

a circuitry for determining a three-dimensional board plane, configured to acquire at least three three-dimensional board point coordinates, and determine a three-dimensional board plane based on the three-dimensional board point coordinates; the three-dimensional board point coordinates are coordinates corresponding to preset board points on the multimedia blackboard board, wherein the preset board points comprise a preset key point, and the three-dimensional board point coordinates comprise a three-dimensional key coordinate corresponding to the preset key point;

a circuitry for generating a three-dimensional key straight-line, configured to generate a three-dimensional key straight-line according to the three-dimensional key coordinate and the three-dimensional core coordinate, the three-dimensional key straight-line corresponding to a straight-line connecting the three-dimensional key coordinate to the three-dimensional core coordinate;

a circuitry for adjusting the multimedia blackboard, configured to adjust the multimedia blackboard so that the three-dimensional key straight-line and the three-dimensional board plane are in a preset positional relationship, a circuitry for acquiring, before the adjusting a multimedia blackboard and by multi-view cameras, a plurality of classroom images simultaneously, and determining ground intersection point positions of at least four ground intersection points in the classroom images, wherein the multimedia blackboard comprises the multi-view cameras arranged horizontally in line, and optical axes of the multi-view cameras are parallel to the original horizontal plane and are perpendicular to the multimedia blackboard board; and each of the ground intersection points is a point on an intersection line where the classroom ground and at least one or more classroom planes intersect at the same time;

a circuitry for generating a three-dimensional ground intersection point coordinate corresponding to each of the ground intersection points according to the classroom images, the ground intersection point positions, and lens information of the multi-view cameras; and a circuitry for generating the three-dimensional ground according to a preset intersection point connection relationship and a three-dimensional ground intersection point coordinate.

8. A non-transitory computer-readable storage medium with a computer program stored thereon, wherein the program implements the method according to claim 1 upon being executed by a processor.

9. An electronic apparatus, comprising:
one or more processors;
a storage device configured to store one or more programs, which enable the one or more processors to implement the method according to claim 1 upon being executed by the one or more processors.

\* \* \* \* \*